(12) United States Patent
Cuffaro (10) Patent No.: US 10,598,384 B2
(45) Date of Patent: Mar. 24, 2020

(54) COLLAPSIBLE COOKING STOVE

(71) Applicant: Daniel F. Cuffaro, Lakewood, OH (US)

(72) Inventor: Daniel F. Cuffaro, Lakewood, OH (US)

( * ) Notice: Subject to any disclaimer, the term of this patent is extended or adjusted under 35 U.S.C. 154(b) by 218 days.

(21) Appl. No.: 15/433,204

(22) Filed: Feb. 15, 2017

(65) Prior Publication Data

US 2017/0234544 A1 Aug. 17, 2017

Related U.S. Application Data

(60) Provisional application No. 62/295,786, filed on Feb. 16, 2016.

(51) Int. Cl.
*F24B 1/20* (2006.01)
*A47J 37/07* (2006.01)

(52) U.S. Cl.
CPC ........... *F24B 1/205* (2013.01); *A47J 37/0763* (2013.01); *A47J 2037/0777* (2013.01)

(58) Field of Classification Search
CPC ....................................... F24B 1/205
USPC .......................... 126/29, 59, 25 B
See application file for complete search history.

(56) References Cited

U.S. PATENT DOCUMENTS

| | | | | |
|---|---|---|---|---|
| 4,759,276 A * | 7/1988 | Segroves | ............ | A47J 37/0713 126/25 R |
| 4,962,697 A * | 10/1990 | Farrar | ................. | A47J 37/0704 126/25 R |
| 5,002,037 A * | 3/1991 | Armstrong | .............. | F24B 1/205 126/29 |
| 5,183,027 A * | 2/1993 | Saldana | .............. | A47J 37/0704 108/50.13 |
| 5,363,977 A * | 11/1994 | Hoff | ..................... | A47J 37/0763 126/25 R |
| 6,543,435 B1 * | 4/2003 | Regen | ................. | A47J 37/0704 126/25 R |
| 2011/0155021 A1 * | 6/2011 | Geitner | .................... | A47B 3/08 108/25 |
| 2014/0116415 A1 * | 5/2014 | Birke | .................. | A47J 37/0781 126/37 A |

* cited by examiner

*Primary Examiner* — Grant Moubry
*Assistant Examiner* — Rabeeul I Zuberi
(74) *Attorney, Agent, or Firm* — Ulmer & Berne LLP (57) ABSTRACT

A collapsible stove includes an expandable combustion chamber formed from nested annular rings that can collapse to about the height of a single ring and expand into a combustion chamber for burning combustible materials. Ventilation holes at the bottom of the combustion chamber provide airflow into the combustion chamber. The combustion chamber is frustoconical and narrows at the top which increases air flow into the combustion chamber via the Venturi effect. Fuel can be added and ignited in the combustion chamber and cookware containing food can be placed onto an associated top plate suspending the combustion chamber. The collapsible stove can include rotatable legs. To use the stove, the rotatable legs can be opened, allowing the nested annular rings to telescope and expand to form the combustion chamber. For carrying and storage, the nested annular rings can be collapsed and a rotatable leg can secure the rings in the collapsed configuration.

17 Claims, 8 Drawing Sheets

COLLAPSIBLE COOKING STOVE

REFERENCE TO RELATED APPLICATIONS

This application claims the benefit of U.S. Provisional Patent Application No. 62/295,786 filed Feb. 16, 2016 and titled "Portable Cooking Stove", which is herein incorporated by reference.

TECHNICAL FIELD

This application relates generally to a stove having a collapsible combustion chamber. The application relates more particularly to a lightweight portable cooking stove having nested tapered rings that are configured to extend to form a combustion chamber when suspended from the cooking surface.

BACKGROUND

People participate in outdoor recreational activities such as camping. Campers often build fires for warmth and for cooking. A cooking stove can be used to direct and concentrate flames and heat onto cooking containers such as pots, pans, or plates. Current cooking stoves have disadvantages. Stoves that rely on prepackaged fuel, such as propane or liquid fuel require the user to carry a supply of fuel in order for the stove to be used. Often, these supplies can be heavy and bulky. Once the supply of fuel is exhausted, then the stove is no longer usable. Also, stoves that use wood as fuel are often bulky because they have combustion chambers that need to be large enough to hold a useful amount of wood.

SUMMARY

In accordance with an example embodiment of the subject application, a collapsible stove includes a combustion chamber and a top plate displaced over the combustion chamber. The combustion chamber includes a number of tapered annular rings that are configured to telescope into the combustion chamber when the stove is opened into the open configuration. The tapered annular rings are configured to collapse into a nested configuration when the stove is closed into the closed configuration. The top plate includes a aperture that opens to the combustion chamber and includes stand offs to support a cooking container such as a pot, pan, or plate over the aperture to the combustion chamber. One of the tapered annular rings, for example the bottom ring, can include a number of ventilation holes. The combustion chamber when opened is substantially frustoconical which, during combustion, enables the Venturi effect to increase air flow to combustible materials placed into the combustion chamber and burned. The combustion chamber can be secured to, and hang from or be suspended from, the top plate. The combustion chamber can be suspended such that there is an air gap between the bottom plate of the combustion chamber and the surface upon which the the stove is placed. The combustion chamber can be permanently or removably secured to the top plate. A plurality of rotatable leg supports and suspend the stove and combustion chamber in an elevated position when the stove and the legs are opened. When collapsed, one or both of the legs can secure the tapered annular rings in the nested configuration, for example by abutting a portion of a leg against the bottom plate. One or both rotatable legs can secure the stove in the collapsed configuration, for example by pressing on the other leg or frame. The top cover can include an opening that has a wider diameter than the combustion chamber but a smaller diameter than the top plate, such that the top plate can rest upon a least a portion of the top cover and the combustion chamber can be suspended in the opening. The stove can include a frame to which the top plate is secured, with the top cover sandwiched between the frame and top plate. One or more connectors or pegs or a combination thereof can be configured to pass into holes in the other members and allow the top plate to be secured to the frame. The pegs can be fixed to one of the members. The rotatable legs can be coupled to the frame in such a way as to allow at least partial rotation. When collapsed the nested tapered annular rings collapse to have a height that is approximately the height of the frame and top plate, so as to facilitate storage and carrying. Similarly, the legs can collapse into the frame so that the entire stove is approximately the height between the bottom of the frame and the top of the top plate.

In accordance with an example embodiment of the subject application, a collapsible stove includes a frustoconical combustion chamber having a number of tapered annular rings that can telescope and expand into the fully open configuration from a nested configuration. When the rings are in the nested configuration, the combined height of the nested rings is approximately the height of a single ring. The combustion chamber has a wider diameter at the bottom than the top. The shape of the combustion chamber can facilitate the flow of air into the combustion chamber via the Venturi effect. The stove can include two or more rotatable legs. When rotated closed, one or more of the legs can secure the tapered annular rings in the collapsed nested configuration. When rotated opened, the legs can suspend the combustion chamber, for example over the ground. A top plate can hold cookware above the combustion chamber and an associated top cover can hold the top plate and suspend the combustion chamber above the ground. The combustion chamber can be secured to the top plate either removably or permanently.

In accordance with an example embodiment of the subject application, a method includes opening at least one rotatable leg of a collapsible stove to release a number of nested tapered rings. When released, the tapered rings expand, for example by telescoping, into a suspended frustoconical combustion chamber. The method can include placing combustible fuel into the combustion chamber and igniting the fuel to generate heat above a tape plate associated with the stove. By placing cookware containing a food item onto the top plate, the food item can be cooked. After use, the combustion chamber can be emptied of residual ash and unburned fuel, for example by inverting the stove and collapsing the combustion chamber into a nested configuration. When in the nested configuration the tapered rings have the height of approximately a single one of the tapered rings. By closing a rotatable leg, the rings can be secured in a nested, collapsed configuration.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Figure 1A:
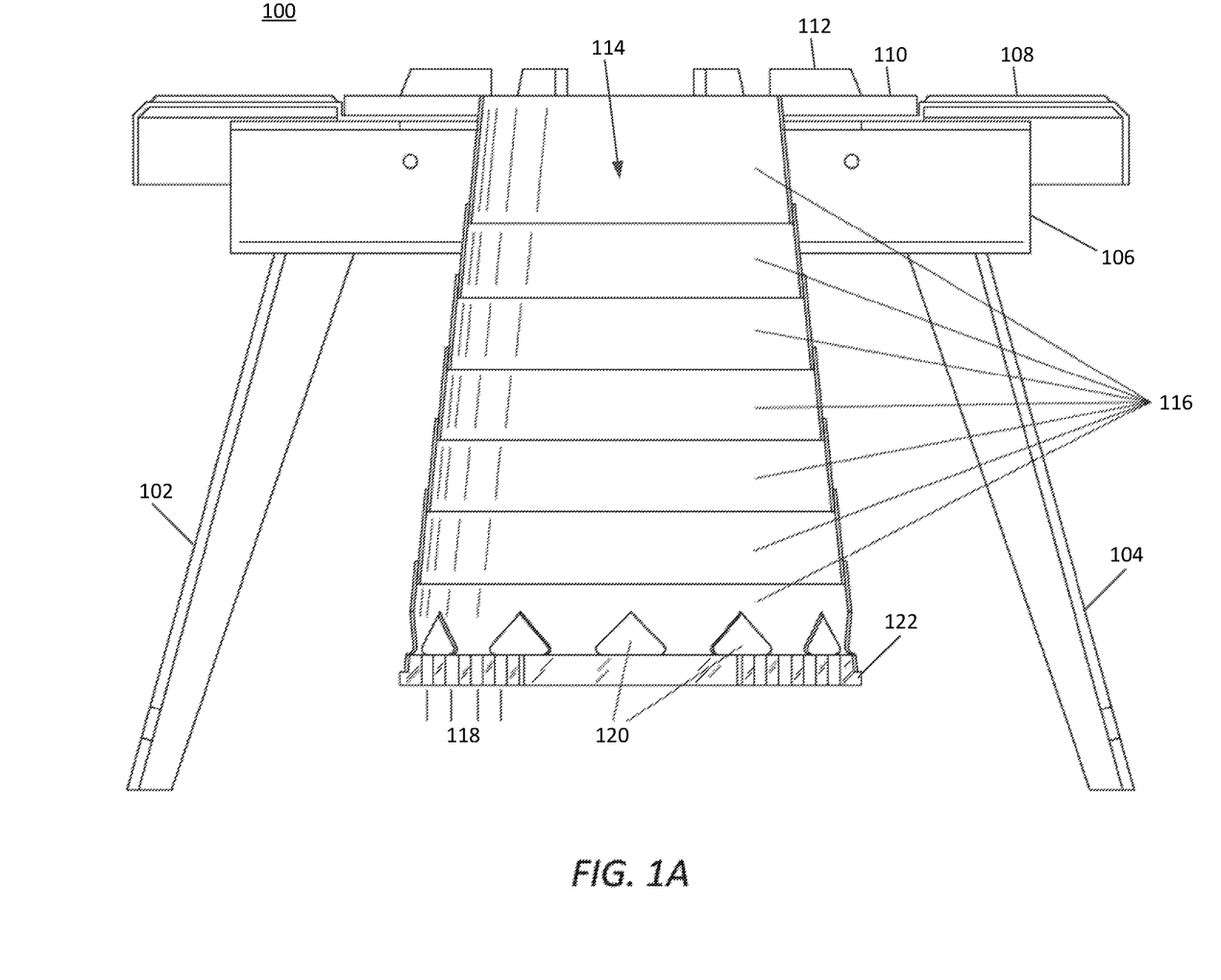
FIG. 1A is a section view of a collapsible stove in an opened configuration according to an embodiment of the disclosure.
Figure 1B:
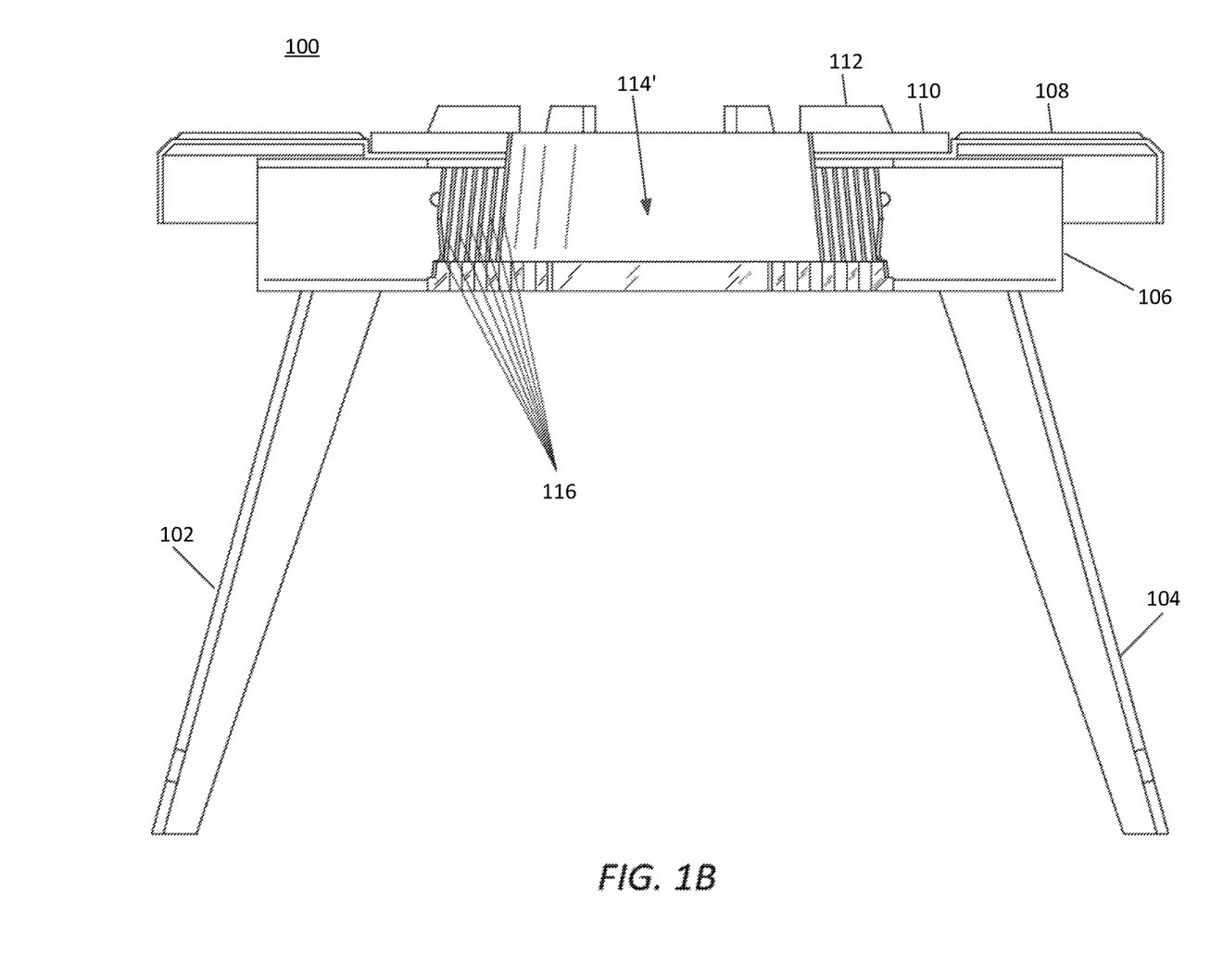
FIG. 1B is a section view of the collapsible stove of FIG. 1A in a partially collapsed configuration according to an embodiment of the disclosure.
Figure 1C:
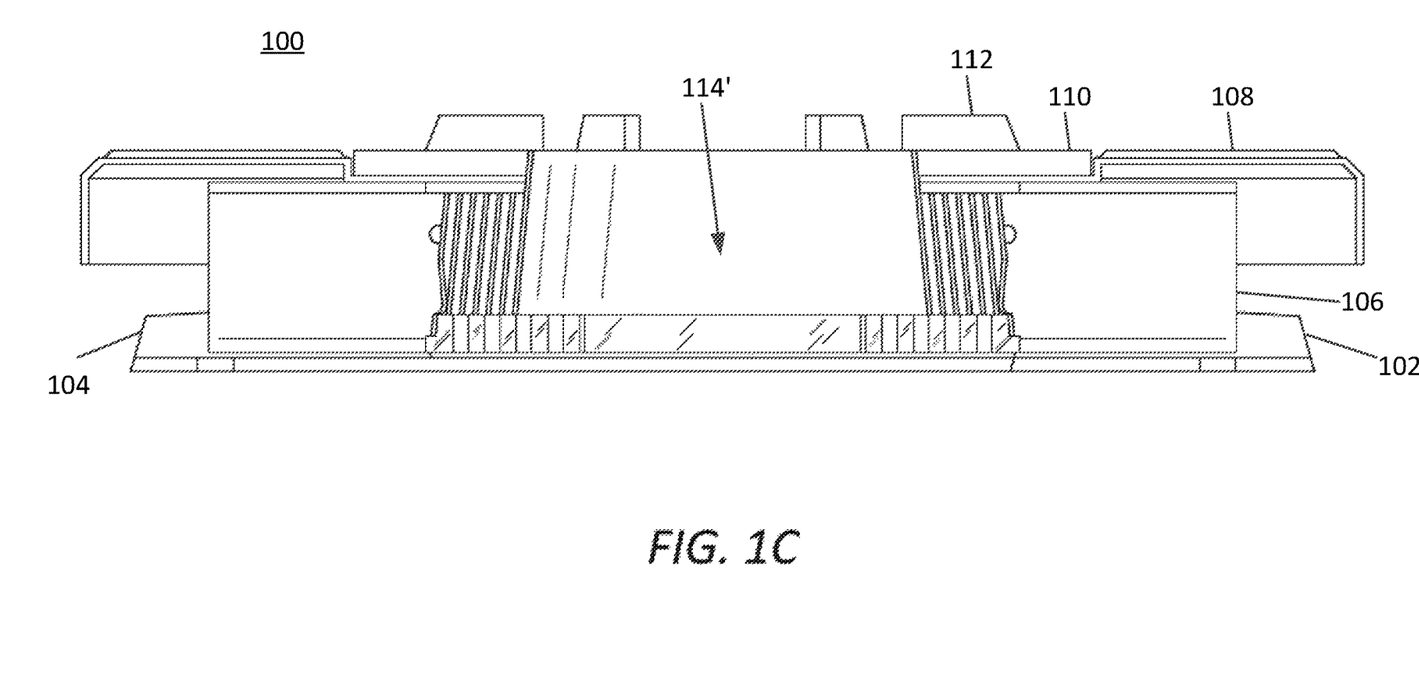
FIG. 1C is a section view of the collapsible stove of FIG. 1B in a fully collapsed configuration according to an embodiment of the disclosure.

Referring to FIGS. 1A, 1B, and 1C, illustrated is an example embodiment of a collapsible stove 100. FIG. 1A illustrates a section view of the collapsible stove 100 in the fully open configuration. FIG. 1B illustrates a section view the collapsible stove 100 in a partially open configuration. FIG. 1C illustrates a section view the collapsible stove 100 in the fully collapsed configuration. The collapsible stove 100 comprises a first leg 102, a second leg 104, a frame 106, a top cover 108, a top plate 110, and a collapsible combustion chamber 114.

The legs 102, 104 can attach to a frame 106 via a rotatable pivot point, allowing the legs 102, 104 to be opened in order to suspend the frame 106, surface 108, top plate 110, and combustion chamber 114 above the ground. In a configuration, each of the legs 102, 104 can rotate more than ninety degrees to provide stable support of the frame 106. In a configuration, the legs 102, 104 can be configured to stop rotating once part of the legs 102, 104 abuts part of the frame 106. In another configuration, the legs 102, 104 and frame 106 can be configured to increase friction between members as the legs 102, 104 are rotated into the open position. In another configuration, detents such as protrusions or indents in the frame 106 and/or legs 102, 104 can limit rotation or secure the legs 102, 104 in the open position as would be understood in the art. The legs 102, 104 can be secured similarly in the closed position. In a configuration, clevis pins or other types of removable connectors can be used to secure the legs 102, 104 to the frame 106, while facilitating easy removal for cleaning or replacement. In other embodiments, fixed legs, telescoping legs, or multi-part legs can be used as would be understood in the art.

Figure 6A:
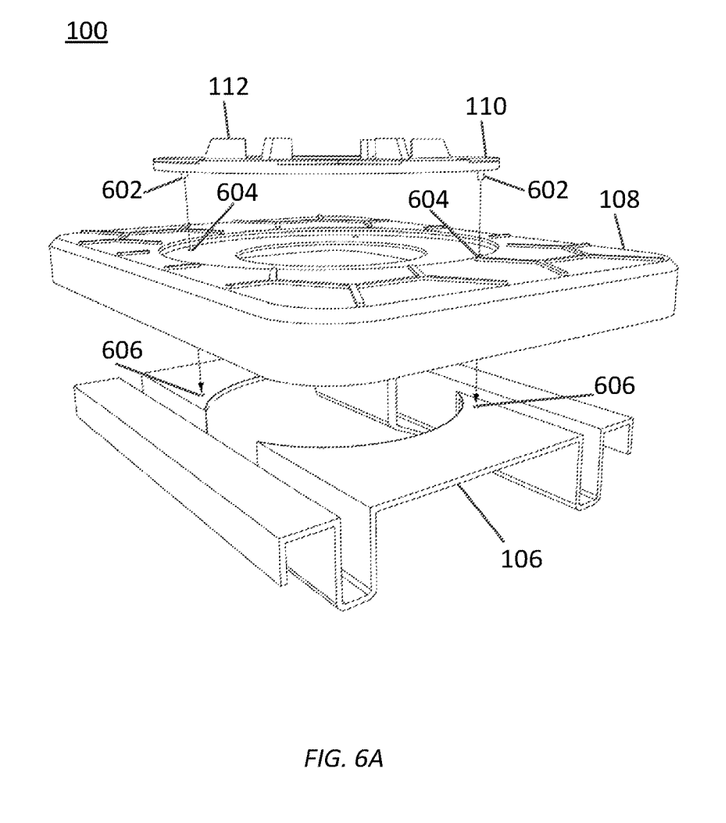
FIG. 6A is a top exploded view of a portion of the collapsible stove according to an embodiment of the disclosure.
Figure 6B:
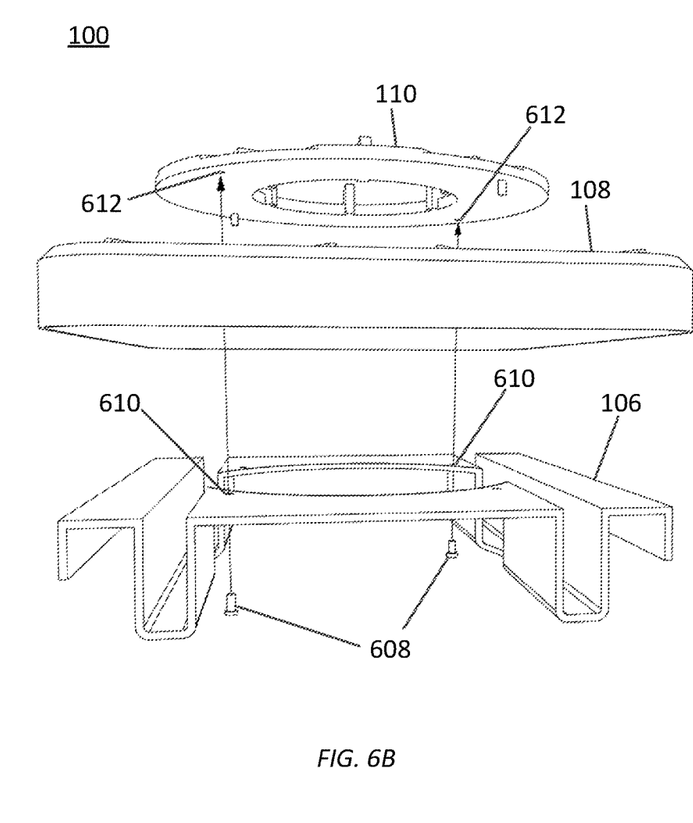
FIG. 6B is a bottom exploded view of a portion of the collapsible stove according to an embodiment of the disclosure.

Referring also to FIGS. 6A and 6B, the top cover 108 and top plate 110 can be secured to the frame 106. For example, the top cover 108 can be positioned on the frame 106 and the top plate 110 positioned on top of the top cover 108. The top cover 108, top plate 110, and frame 106 can then be secured together, for example using screws, c-clips, bayonet mounts, and other connectors. For example, as illustrated in FIG. 6B, screws 608 pass through thru holes 610 in the frame 106 and thru holes (not shown) in the top cover 108 and into threaded screw holes 612 in the top plate 110. For ease of assembly, a combination of pegs and holes can be used in combination with connectors. One or more pegs can be fixably attached to one of the top plate 110, the frame 106, or the top cover 108 and be configured to enter into holes in the other parts. The pegs and holes can align and hold the top plate 110, frame 106, and top cover 108 in place and also align other holes for the connectors. For example, as illustrated in FIG. 6A, pegs 602 in the top plate 110 pass through thru holes 604 in the top cover 108 and into holes 606 in the frame 106. One or more connectors can then be used to secure the parts together as described above and as illustrated in FIG. 6B. Easily removable connectors, such as bayonet mounts, can be used in combination with pegs and holes to make it easier for the user to take the pieces apart for maintenance and cleaning, especially in the field where a user may not have tools available or easily accessible.

Figure 4A:
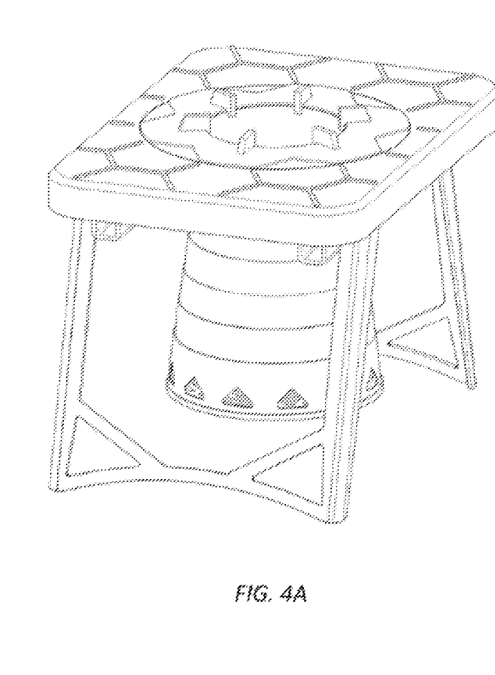
FIG. 4A is a top perspective view of a collapsible stove in an opened configuration according to an embodiment of the disclosure.
Figure 4B:
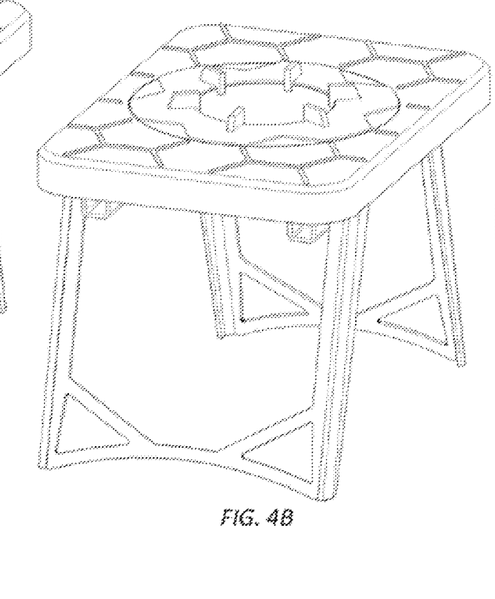
FIG. 4B is a top perspective view of the collapsible stove of FIG. 4A in a partially collapsed configuration according to an embodiment of the disclosure.
Figure 4C:
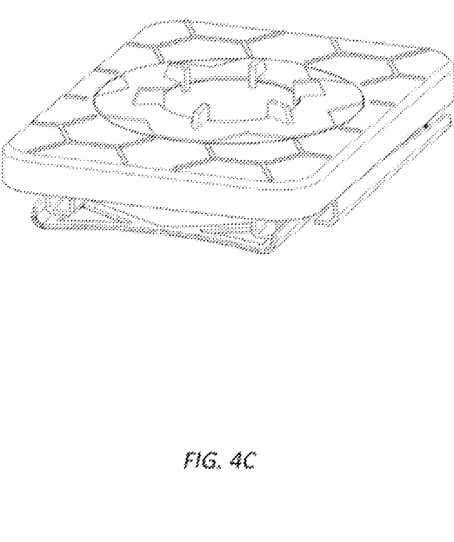
FIG. 4C is a top perspective view of the collapsible stove of FIG. 4B in a fully collapsed configuration according to an embodiment of the disclosure.

In different embodiments, the top cover 108, top plate 110, and frame 106 can be individual pieces or can be combined into one or more pieces as would be understood in the art. In the embodiment presented in the associated figures, the top cover 108, top plate 110, and frame 106 are individual pieces. This embodiment advantageously takes advantage of different materials to reduce cost, reduce weight, add strength, improve durability, and improve temperature control. For example, the top cover 108, frame 106, and legs 102, 104 can be constructed of stamped aluminum, and can include ridges and other structural features, for example as illustrated in FIGS. 4A-4C, to improve stiffness without substantially adding weight. Keeping the top cover 108 separate from the top plate 110 advantageously reduces substantial heat transfer from the top plate 110 and the associated combustion chamber 114 to the top cover 108, thereby reducing the likelihood of accidental burns to users during use and providing a cooler surface for placement of utensils or food preparation activities such as cutting. The combustion chamber 114 can be constructed of a suitable lightweight high temperature material such as stainless steel. The top plate 110 and stand off 112 can be constructed of cast aluminum that provides both durability and ample heat conduction to an associated pot, pan, or plate.

The top plate 110 can include a plurality of stand offs 112. The stand offs 112 can elevate a pot, pan, or plate that is placed on the stand offs 112. The stand offs 112 allow an air gap between top plate 110 and the pot, pan, or plate for exhaust gasses to escape from the combustion chamber 114. In a configuration, the stand offs 112 can be integrated into the top plate 110, for example as a single cast part. In another configuration, the stand offs 112 can be removable or configured to fold down or rotate into the combustion chamber 114 to further reduce space or to allow a pot or pan to be placed over the combustion chamber 114 to help extinguish any burning material therein.

The combustion chamber 114 can be secured to the top plate 110, for example using a bayonet mount, a screw thread, individual screws, or permanent affixation such as welding. The combustion chamber 114 is comprised of a plurality of concentric rings 116, for example tapered annular or cylindrical rings as shown. The rings 116 are configured such that a lower portion of each ring 116 has a larger diameter than an upper portion of an adjacent ring 116. In this way, when the rings 116 are allowed to expand, for example by the action of gravity, each ring 116 will hold the ring 116 below in place to form a substantially sealed combustion chamber 114 that has an approximately frustoconical shape. The frustoconical shape of the combustion chamber 114 not only concentrates heat at the top plate 110, but also advantageously takes advantage of the Venturi effect to draw ample air into the combustion chamber 114 to increase combustion and heat production. One or more rings 116 can include a plurality of ventilation holes 120 for drawing air into the combustion chamber 114. The ventilation holes 120 can be configured to allow air to enter the combustion chamber 114, or allow ash to be removed, while keeping burning material and hot coals safely inside of the combustion chamber 114. The ventilation holes 120 can be approximately triangular in shape as illustrated. A bottom plate 122 can be secured to the lowest ring 116 to retain burning material, for example using screws, threads, or other means of securing as described above. The bottom plate 118 also can include ventilation holes 118. The bottom plate 122 can have a larger diameter than the diameter of any ring 116 and advantageously assist in securing the rings 116 when the combustion chamber 114' is in the collapsed configuration.

The combustion chamber 114' can be collapsed into a collapsed configuration as shown in FIG. 1B. When collapsed the rings 116 nest inside one another. In this way, the combustion chamber 114' reduces to a height approximately equal to that of the rest of the collapsible stove 100. The first leg 102 can be rotated from the open position to the closed position as shown in FIG. 1C. The second leg 104 can be similarly closed. One or both of the legs 102, 104 can secured the combustion chamber 114' in the collapsed configuration, for example by having a portion of a leg 102, 104 overlap part of the combustion chamber 114'. Advantageously, the combustion chamber 114' will not open or expand until one or both of the legs 102, 104 are opened.

Advantageously, the tapered cylindrical sections or rings 116 of the combustion chamber 114' can be nested into a compact configuration for ease of storage and carrying of the collapsible stove 100. A user can collapse the sections into the compact configuration by hand or by turning the stove upside down and allowing the rings 116 to collapse by the action of gravity. This might be performed, for example, when emptying the combustion chamber of ash or leftover unburned fuel prior to storage. Once the combustion chamber 114' is collapsed, the user can close the legs of the collapsible stove 100 to secure the collapsed rings 116 in place for storage and carrying. In an embodiment, the tapered cylindrical sections or rings 116 of the combustion chamber 114 can include structures for locking the rings in the open configuration. For example, each ring can include screw threads or bayonet mounts for locking each ring with an adjacent ring.

Figure 2A:
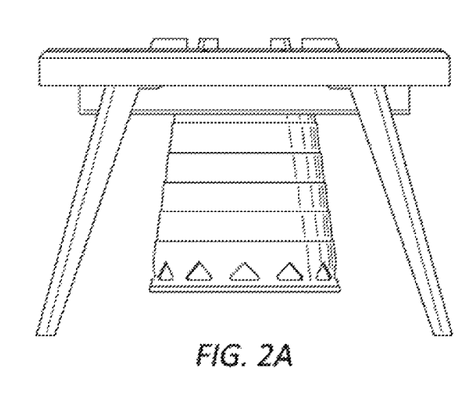
FIG. 2A is a side view of a collapsible stove in an opened configuration according to an embodiment of the disclosure.
Figure 2B:
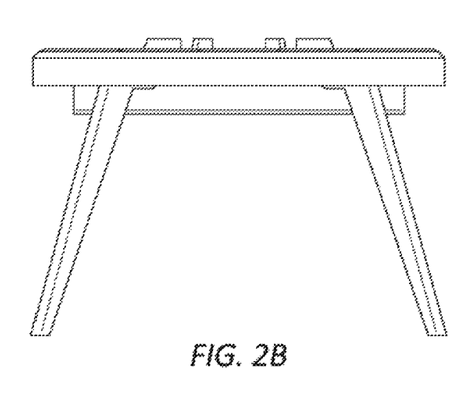
FIG. 2B is a side view of the collapsible stove of FIG. 2A in a partially collapsed configuration according to an embodiment of the disclosure.
Figure 2C:
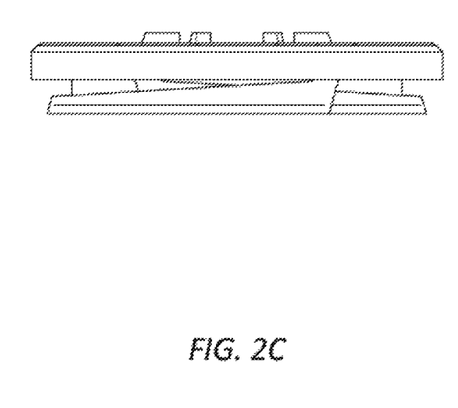
FIG. 2C is a side view of the collapsible stove of FIG. 2B in a fully collapsed configuration according to an embodiment of the disclosure.
Figure 3A:
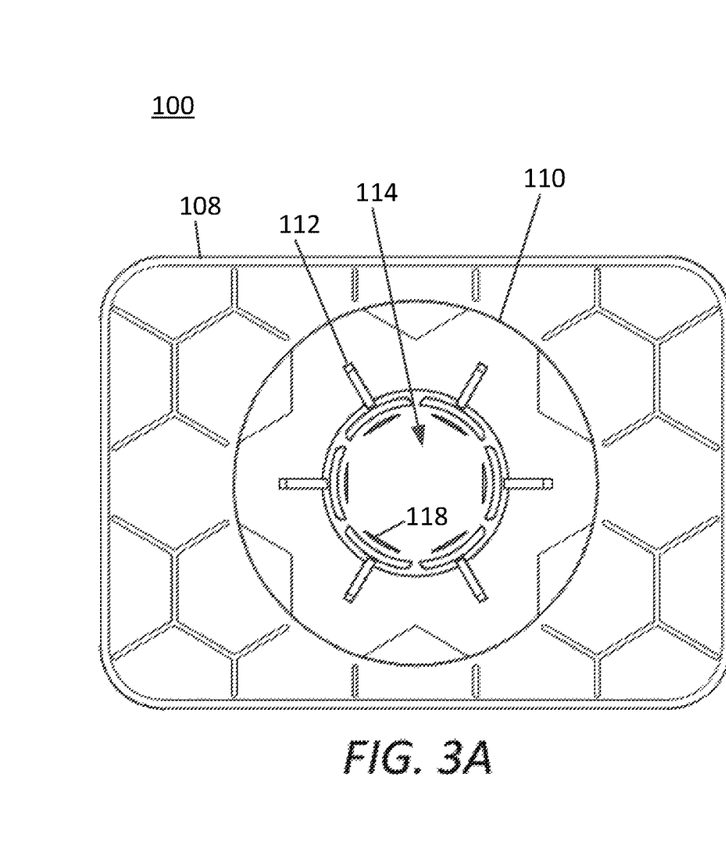
FIG. 3A is a top view of a collapsible stove according to an embodiment of the disclosure.
Figure 3B:
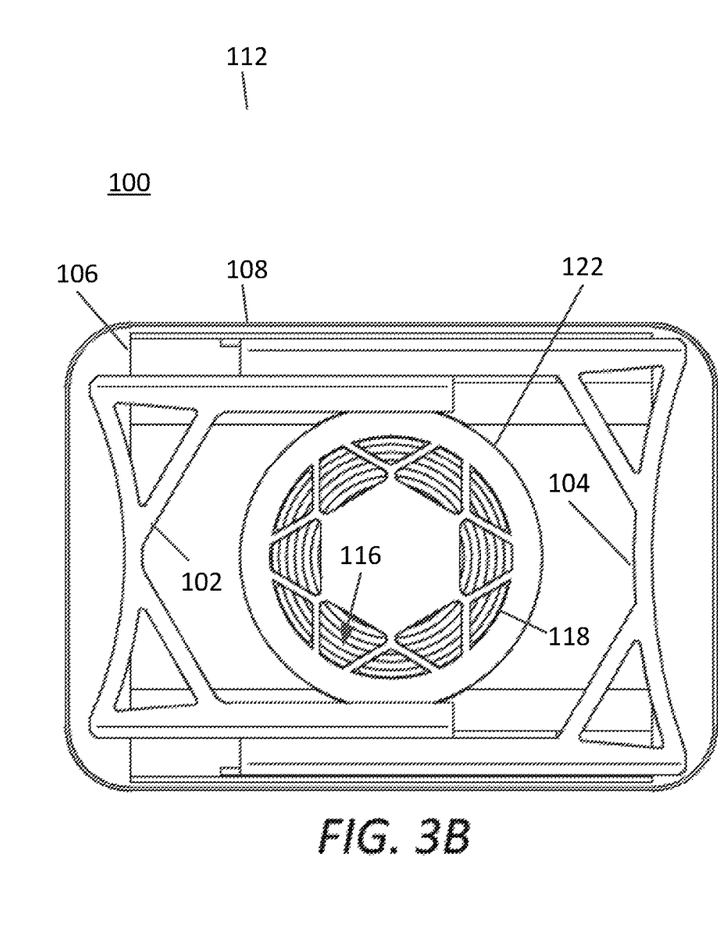
FIG. 3B is a bottom view of the collapsible stove of FIG. 3A in a collapsed configuration according to an embodiment of the disclosure.

FIGS. 2A, 2B, and 2C illustrate side views of the collapsible stove of FIGS. 1A, 1B, and 1C. FIGS. 3A and 3B illustrate top and bottom views of the collapsible stove 100 respectively. In the top view of FIG. 3A, the top cover 108 includes ridges 302 that can add structural support and stiffness to the top cover 108, or provide a distinctive decorative look. For example, the ridges 302 as illustrated form a hexagonal pattern. The choice of a hexagonal pattern, or any other desired pattern, can be selected for aesthetic or design reasons. However, any suitable shape of ridge 302 can be used to increase structural strength, and the ridge 302 can be configured to add strength while minimizing the amount of additional material and weight. The pattern of the ridges 302 can be partially carried to the top plate 110 as shown for decorative or design reasons.

In the bottom view of FIG. 3B, the first leg 102 is illustrated securing the combustion chamber in the collapsed configuration by overlapping a portion of the first leg 102 against the bottom plate 122. The ventilation holes 118 of the bottom plate 122 can be configured to allow ample air flow while retaining hot coals and allowing spent ash to be emptied. The ventilation holes 118 can be reinforced for added strength and heat resistance. The second leg 104 is illustrated as having a portion that fits between the frame 106 and first leg 102. By appropriately sizing portions of the first leg 102, the second leg 104, and the frame 106, the legs 102, 104 can be secured against one another or the frame 106 by friction, thereby facilitating the carrying and storing of the collapsible stove 100 in the collapsed configuration. In various configurations, indentations, detents, straps, springs, or other means of securing can be used in addition to, or instead of, friction as would be understood in the art.

Figure 5A:
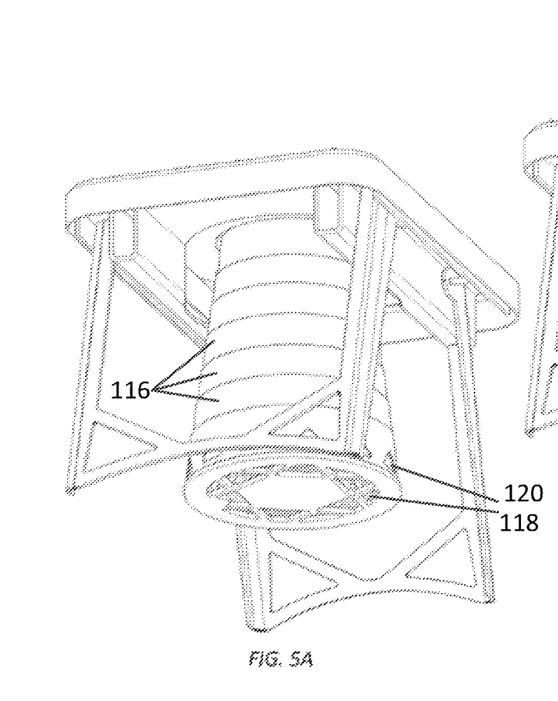
FIG. 5A is a bottom perspective view of a collapsible stove in an opened configuration according to an embodiment of the disclosure.
Figure 5B:
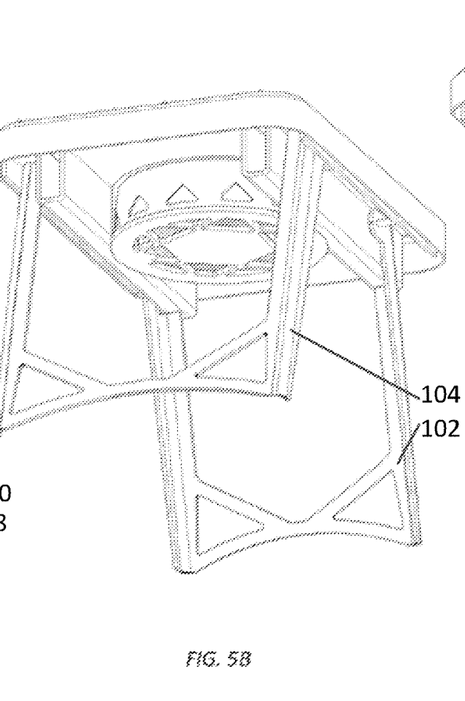
FIG. 5B is a bottom perspective view of the collapsible stove of FIG. 5A in a partially collapsed configuration according to an embodiment of the disclosure.
Figure 5C:
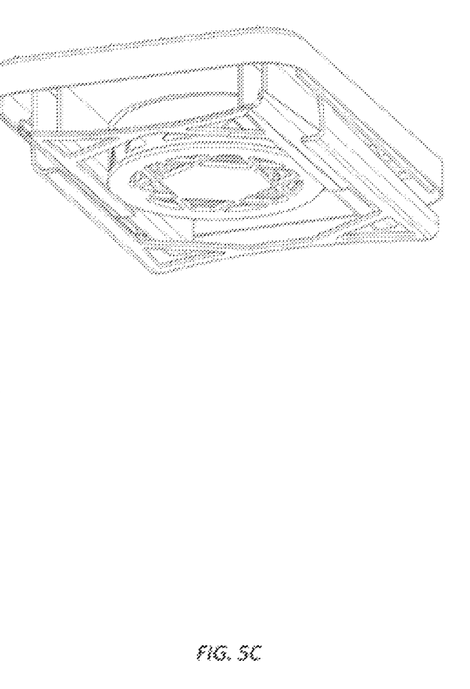
FIG. 5C is a bottom perspective view of the collapsible stove of FIG. 5B in a fully collapsed configuration according to an embodiment of the disclosure.

FIGS. 4A, 4B, and 4C similarly illustrate top perspective views of the collapsible stove of FIGS. 1A, 1B, and 1C. FIGS. 5A, 5B, and 5C similarly illustrate bottom perspective views of the collapsible stove of FIGS. 1A, 1B, and 1C.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A collapsible stove, comprising:
    a combustion chamber configured to burn a combustible material and further comprising
    a plurality of tapered annular rings configured to telescope to form the combustion chamber when the collapsible stove is in an open configuration and further configured to collapse into a nested configuration when the collapsible stove is in a collapsed configuration; and a top plate displaced over the combustion chamber, the top plate having an aperture open to the combustion chamber, and the top plate configured to support a cooking container over the aperture, wherein the combustion chamber is substantially frustoconical in the open configuration and configured to generate air flow in the combustion chamber using the Venturi effect to burn the combustible material, and wherein in the open configuration the diameter of the combustion chamber at the bottom is larger than the diameter of the combustion chamber at the top;

a plurality of rotatable leg supports configured to suspend the combustion chamber in an elevated position when the collapsible stove is in the open configuration, and wherein at least one rotatable leg support is configured to secure the tapered annular rings in the nested configuration when the collapsible stove is in the collapsed configuration.

2. The collapsible stove of claim 1, wherein at least one of the tapered annular rings includes a plurality of ventilation holes.

3. The collapsible stove of claim 1, wherein the combustion chamber is fixably secured to the top plate and configured to hang from the top plate when in the open configuration.

4. The collapsible stove of claim 1, wherein at least one rotatable leg support is configured to secure the plurality of rotatable leg supports in the closed configuration when the collapsible stove is in the collapsed configuration.

5. The collapsible stove of claim 1, further comprising: a top cover having an opening with a diameter larger than a diameter of the combustion chamber and smaller than a diameter of the top plate, and configured to hold the top plate above the opening and at least a portion of the combustion chamber in the opening.

6. The collapsible stove of claim 5, further comprising:
a frame, and
wherein the top plate is secured to the frame, and
wherein the rotatable leg supports are rotatably coupled to the frame.

7. The collapsible stove of claim 6, wherein the plurality of tapered annular rings are configured to collapse into the nested configuration that has a height approximately that of the combined height of the frame and the top plate.

8. The collapsible stove of claim 6, wherein the plurality of tapered annular rings are configured to expand into a combustion chamber that has a height that allows an air gap between a bottom of the combustion chamber and a surface onto which the collapsible stove is placed.

9. The collapsible stove of claim 8, wherein when the plurality of tapered annular rings are collapsed into the nested configuration, and the rotatable leg supports are in the closed configuration, the collapsible stove has a height approximately that of the combined height of the frame and the top plate.

10. The collapsible stove of claim 6, further comprising:
at least one connector configured to secure the frame to the top plate,
wherein the top cover includes a plurality of holes,
wherein each connector passes through an associated hole in the top cover, and
wherein the top cover is secured between the frame and the top plate by the at least one connector.

11. The collapsible stove of claim 10, further comprising:
a plurality of pegs each configured to pass into a hole in at least one of the too cover, the top plate or the frame, and
wherein the plurality of pegs are configured to position the top plate, top cover, and frame relative to one another and align at least one hole in the top cover for a connector to pass through for securing the top plate to the frame.

12. The collapsible stove of claim 11, further comprising:
wherein each peg is affixed to exactly one of the top plate, the top cover, or the frame.

13. A cooking stove, comprising:
a frustoconical combustion chamber comprising a plurality of tapered annular rings configured to telescope and expand into a fully open configuration from a nested configuration,
wherein when the tapered annular rings are in the nested configuration, the combined height of the tapered annular rings is about the height of a single tapered annular ring,
wherein the combustion chamber is configured to have a wider diameter at a bottom of the combustion chamber than at a top of the combustion chamber, and
wherein the frustoconical combustion chamber is configured to generate air flow using the Venturi effect when combustible materials are burned in the combustion chamber; and
a plurality of rotatable leas configured to secure the tapered annular rings in the nested configuration when rotated closed and suspend the combustion chamber when rotated opened.

14. The cooking stove of claim 13, further comprising: a top plate configured to hold cookware above the combustion chamber; and a top cover configured to hold the top plate and suspend the combustion chamber above the ground, and wherein the combustion chamber is secured to the top plate.

15. A method, comprising:
opening a rotatable leg of a collapsible cooking stove to release a plurality of nested tapered rings of the stove; and
expanding the nested tapered rings into a suspended frustoconical combustion chamber that has a diameter that increases from too to bottom and that is configured to generate air flow using the Venturi effect when combustible fuel is burned in the combustion chamber.

16. The method of claim 15, further comprising:
placing a combustible fuel in the combustion chamber,
igniting the combustible fuel in the combustion chamber to burn the combustible fuel and generate heat above a top plate associated with the stove; and
placing cookware containing a food item onto the top plate to cook the food item.

17. The method of claim 15, further comprising:
emptying the combustion chamber of ash and unburned fuel;
collapsing the combustion chamber into a plurality of nested tapered rings having a height about that of a single tapered ring; and
closing the rotatable leg to secure the nested tapered rings in a collapsed configuration.

* * * * *